United States Patent [19]

Hobby

[11] Patent Number: 5,246,309
[45] Date of Patent: Sep. 21, 1993

[54] SYSTEM AND METHOD FOR DECONTAMINATION OF CONTAMINATED GROUND

[76] Inventor: Michael M. Hobby, 3985 W. Indigo Meadow Cir., Bennion, Utah 84118

[21] Appl. No.: 701,110

[22] Filed: May 16, 1991

[51] Int. Cl.$^5$ .............................................. B10D 3/38
[52] U.S. Cl. ................... 405/128; 210/615; 210/629; 210/760; 435/266
[58] Field of Search .............. 405/128, 129; 210/603, 210/615, 616, 617, 629, 631, 760; 435/266, 299, 311, 313

[56] References Cited

U.S. PATENT DOCUMENTS

| | | | |
|---|---|---|---|
| 4,323,367 | 4/1982 | Ghosh | 405/129 X |
| 4,427,548 | 1/1984 | Quick | 210/617 |
| 4,483,641 | 11/1984 | Stoll | 405/129 |
| 4,518,399 | 5/1985 | Croskell et al. | 405/129 X |
| 4,723,968 | 2/1988 | Schippert et al. | 435/266 X |
| 4,842,448 | 6/1988 | Koerner et al. | 405/128 X |
| 4,849,114 | 7/1989 | Zeff et al. | 210/760 X |
| 4,849,360 | 7/1989 | Norris et al. | 405/128 X |
| 4,850,745 | 7/1989 | Hater et al. | 405/128 X |
| 4,883,594 | 11/1989 | Sekoulov et al. | 210/617 X |
| 4,919,570 | 4/1990 | Payne | 405/128 |
| 4,940,546 | 7/1990 | Vogelpohl et al. | 210/617 X |
| 4,966,654 | 10/1990 | Carberry | 202/177 |

FOREIGN PATENT DOCUMENTS

3601490 7/1987 Fed. Rep. of Germany ...... 405/128

Primary Examiner—Dennis L. Taylor
Assistant Examiner—John Ricci
Attorney, Agent, or Firm—Jon C. Christiansen

[57] ABSTRACT

A system and method for the decontamination of contaminated ground is described. Contaminated soil gas containing the contaminant is removed from the contaminated ground. Contaminants are separated from the contaminated gas and treated to lessen an environmental hazard of the contaminant. Contaminants are preferably treated by non-thermal oxidation. Residual soil gas, including any oxygen, unoxidized contaminants, and oxidation products (water vapor and carbon dioxide) are returned to the ground, where unoxidized contaminants are subject to oxidation by soil microorganisms. The returned residual soil gas is recirculated through the decontamination system.

20 Claims, 2 Drawing Sheets

SYSTEM AND METHOD FOR DECONTAMINATION OF CONTAMINATED GROUND

INTRODUCTION

The invention described herein relates to methods and systems for the decontamination of ground contaminated with contaminated soil and/or contaminated groundwater. Contamination of soil and groundwater is a significant environmental hazard. Environmental and health concerns, as well as the need to comply with environmental laws and regulations, necessitate the use of methods and systems for the decontamination of soil and groundwater. Currently used decontamination methods and systems are costly, time consuming and/or inadequate.

Air stripping is a conventional technique used for the removal of volatile contaminants from groundwater. It involves pumping contaminated ground water above the surface of the ground and passing the water through a stripping column which provides a water-air interface that allows for the diffusion of contaminants out of the water and into the air. Contaminant-containing air is typically vented to the atmosphere. This release of volatile contaminants into the atmosphere is environmentally unsound as it contributes to air pollution.

Oxidation of contaminants by biotreatment or ozone is an alternative method for decontaminating groundwater which avoids the problems associated with the release of contaminants into the atmosphere. As with air stripping, however, contaminated groundwater must be pumped above the surface for treatment.

One objective of my invention is to eliminate the need to remove groundwater from the ground for treatment and to thereby eliminate the complexity and expense of groundwater pumping.

Another objective of my invention is to provide a means for removing volatile contaminants from soil and groundwater without venting contaminants into the atmosphere.

Another objective of my invention is to provide a method for decontaminating soil and groundwater which is more efficient than currently available methods.

Another objective of my invention is to provide a method for decontaminating soil and groundwater which is more economical than currently available methods.

These objectives and other objectives, advantages and aspects of my invention are further described below.

SUMMARY OF THE INVENTION

My invention provides for the removal of contaminated soil gas from contaminated ground. The removed contaminated soil gas contains at least one volatile contaminant that is treated to lessen an environmental hazard of the contaminant. The treatment can be, for example, oxidation or biodegradation of the contaminant. The products of the oxidation or biodegradation are less harmful, or not harmful, to the environment (in terms of pollution or other contamination), as compared to the contaminant, and thus, the contaminant is deemed to have been treated to lessen an environmental hazard. Treatment of the contaminant results in a residual soil gas. Alternatively, the contaminant of the removed contaminated soil gas can be separated from the gas.

For example, the removed contaminated soil gas can be contacted with a liquid effective for absorption of the contaminant. The separation results in separated contaminant and a residual soil gas. The separated contaminant can be disposed of or, preferably, treated as described above.

The residual soil gas is returned to the ground. The residual soil gas may include residual contaminants, products of the treatment (e.g. water and carbon dioxide), oxygen and/or other materials resulting from the separation and/or treatment. By returning the residual soil gas to the ground, it is available for recirculation through the steps described above. This establishes a loop through which the contaminated soil gas is circulated and recirculated. By maintaining the system as a closed system, the contaminant is not released to the environment, and over time the concentration of contaminant in the ground is decreased by the treatment. The returned residual soil gas collects additional contaminant as it circulates through the ground, and such additional contaminant is then subjected to separation and/or treatment as described above.

A contaminated vadose zone in a contaminated ground region can be remediated, as described above, by positioning vent wells or vapor extraction wells (a means for removal of contaminated soil gas) around the periphery of the contaminated ground region, and by positioning at least one return well (a means for returning residual soil gas to the ground) in the contaminated ground region. The returned residual soil gas flows from the zone of high pressure established by the return well to the zone of low pressure established by the vent wells.

If the ground is contaminated by a contaminated groundwater, drapes of return wells and rows of vent wells can be positioned across the region of ground contamination.

DETAILED DESCRIPTION OF THE INVENTION

My invention is a system and a method for the decontamination of contaminated ground. The contaminated ground can be contaminated soil and/or contaminated groundwater in the ground. The decontamination involves the removal of contaminated soil gas from the contaminated ground. The contaminated soil gas is contaminated by a volatile contaminant. Contaminants may originate, for example, from spills or from tank or line leaks in the ground, or from other sources. Such contaminants may include one or more organic compounds, such as benzene, toluene, xylene, acetone, alcohols, methyl ethyl ketone, tetrahydrofuran, creosote, pentachlorophenol, petroleum hydrocarbons, nonchlorinated solvents, etc. These examples are illustrative, and the practice of this invention is not limited to these contaminants or to organic contaminants. My invention can be practiced for the remediation of any volatile contaminant in the soil gas which can be separated and/or treated as more fully described below. Relevant technical publications and literature are replete with information which identifies and describes contaminants of an environmental concern which can be the target, for remediation purposes, of my invention.

Figure 1:
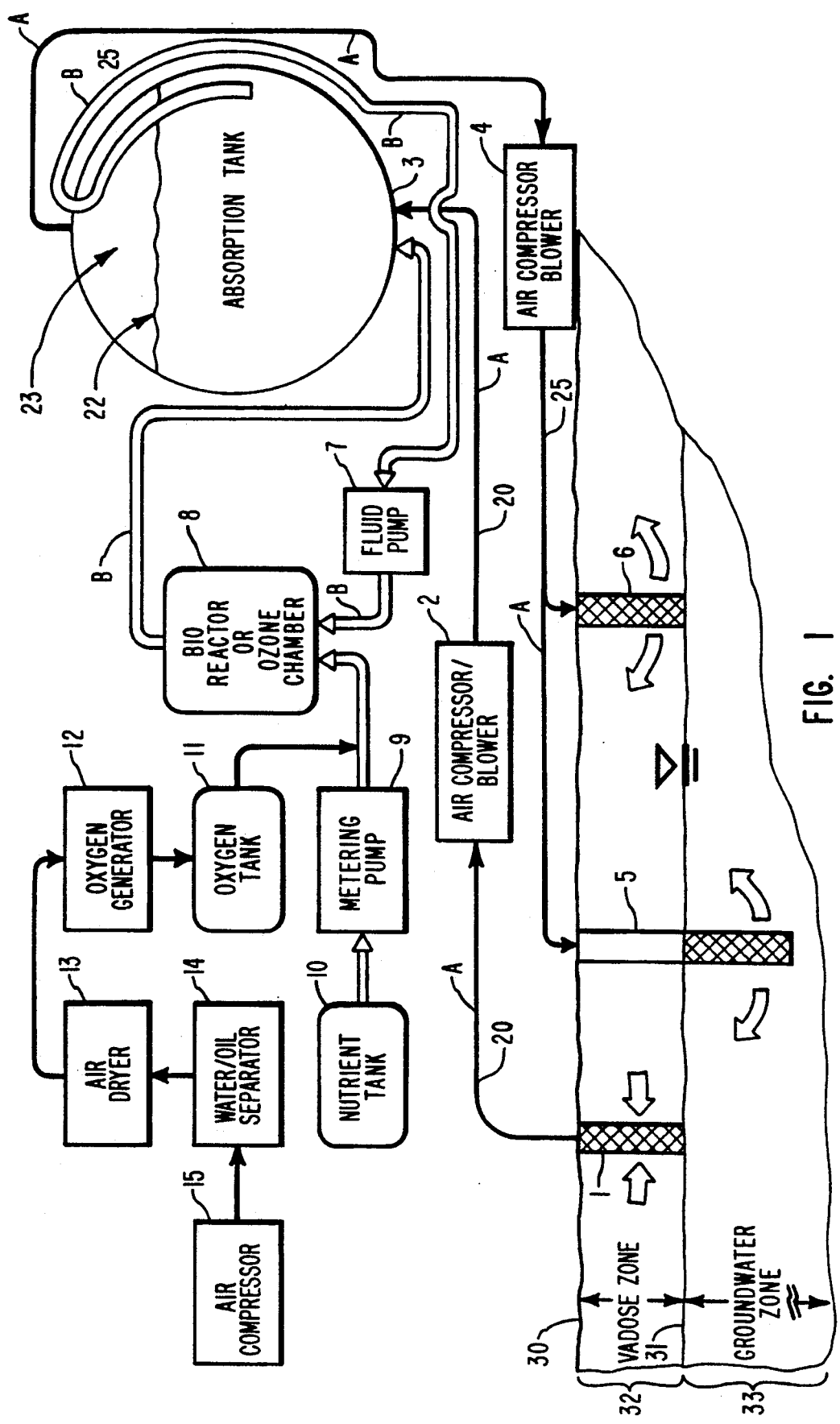
FIG. 1 depicts an embodiment of the invention for use in the decontamination of contaminated ground.
Figure 2:
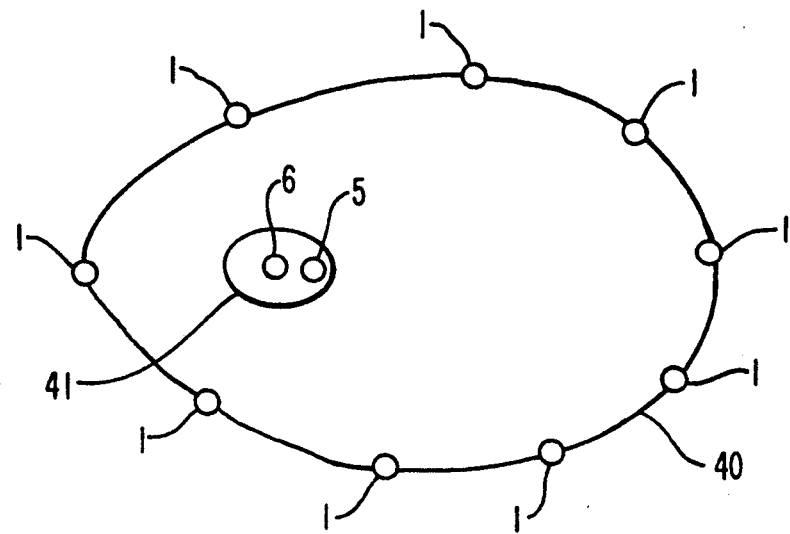
FIG. 2 depicts the placement of wells in an embodiment of the invention used in cases in which the vadose zone is contaminated.

An embodiment of my invention is shown in FIG. 1. Contaminated soil gas is resident in vadose zone 32. The vadose zone is the subsurface zone between ground surface 30 and water table 31. The contaminant in the contaminated soil gas may originate from a source of contamination in vadose zone 32 or may be a volatile contaminant originating from contaminated groundwater in groundwater zone 33.

Contaminated soil gas is drawn into vent well 1 from the surrounding vadose zone 32 due to negative pressure generated by air compressor/blower 2. Although the preferred embodiment of my invention accomplishes the removal of contaminated soil gas via vent wells (vapor extraction wells), the invention can also be practiced by removing contaminated soil gas from the ground by other means. In this embodiment of my invention, contaminated soil gas drawn from vent well 1 is introduced to absorption tank 3 via line 20 running from vent well 1 to the bottom of absorption tank 3. Vent well 1, air compressor/blower 2 and line 20 serve as a means for removing contaminated soil gas from the ground and for introducing the contaminated soil gas to absorption tank 3.

Absorption tank 3 serves as a means for separation of the contaminant from the gas phase (i.e. contaminated soil gas). Absorption tank 3 contains a liquid effective for absorption of contaminant from the gas phase. The contaminated soil gas is introduced at the bottom of tank 3 and as the contaminated soil gas (including volatile contaminant) rises, the contaminants go into solution or suspension in the liquid phase of absorption tank 3. The liquid effective for absorption of the contaminant circulates through loop B. Loop B can be constructed of pipe, conduit or other containment and circulation means for the liquid. Absorption tank 3 and bioreactor 8 are positioned in loop B. The liquid circulates through absorption tank 3 and bioreactor 8. Fluid pump 7 circulates the liquid through loop B, including bioreactor 8 and absorption tank 3.

The circulating liquid introduces separated contaminant (absorbed contaminant) to bioreactor 8 for biodegradation of the contaminant. The biodegradation is accomplished by a microorganism (in sufficient quantity) contained in bioreactor 8. The microorganism is a microorganism effective for biodegradation of the contaminant. Bioreactor 8 serves as an oxidation means for oxidation of the contaminant. Oxidation means 8 can alternatively be a means other than a bioreactor. For example, an ozone chamber can serve as the means for oxidizing the contaminant.

The principle products of the oxidation reactions are carbon dioxide and water vapor. Air and/or other gases, residual unoxidized contaminants, reduced volatiles, water vapor, and excess oxygen (from bioreactor 8) accumulate as residual soil gas at the top of absorption tank 3 above fluid level 22 in residual soil gas zone 23. Generally, this residual soil gas includes residual unoxidized contaminants which, if vented or otherwise released to the atmosphere, would pollute the atmosphere.

The residual soil gas (including residual contaminant, if any) is returned to the ground by injecting the residual soil gas into the subsurface of the ground via return wells, i.e., sparge well 5 or vadose return well 6. The residual soil gas can be drawn into the ground by the negative pressure generated in the vadose zone by air compressor/blower 2. If air compressor/blower 2 generates insufficient negative pressure to draw the residual soil gas back into the ground, an additional air compressor/blower 4, positioned between absorption tank 3 and sparge well 5 or vadose return well 6, can be used for the injection. Line 25 directs the residual soil gas from the top of absorption tank 3 to the return wells (i.e. sparge well 5 and/or vadose return well 6). The return well (5 and/or 6), line 25 and air compressor/blower (2 and/or 4) serve as a means for returning residual soil gas from absorption tank 3 (i.e. from loop B) to the ground. Although the preferred embodiment of the invention utilizes sparge and/or vadose return wells to inject the residual soil gas into the ground, other means of returning the residual soil gas to the ground can be used in the practice of my invention.

Residual soil gas introduced into the groundwater via sparge well 5 or into the vadose zone via vadose return well 6 rises slowly, and spreads horizontally to cover a large area. The spread of residual soil gas from vadose return well 6 through the vadose zone plays an important role in the decontamination process by distributing the residual contamination over a larger area where a greater quantity of naturally occurring bacteria are available for biodegradation of the contaminant. This advantage points to an aspect of my invention of broad applicability. My invention includes a method whereby contaminated soil gas is removed from the ground and returned to the ground for distribution of the contaminant over a larger area of ground to facilitate natural biodegradation of the contaminant.

The spread of residual soil gas from sparge well 5 plays an important role in the decontamination of contaminated groundwater because the relatively higher contaminant concentration in the groundwater compared to the relatively lower concentration in the injected residual soil gas leads to the transfer of volatile contaminant from groundwater into the injected residual soil gas. Because the injected residual soil gas expands in volume as it rises through the groundwater zone, the concentration (on a per unit volume basis) of contaminant in the gas remains low, maintaining the concentration gradient even as contaminant continues to be taken up into the gas from the groundwater. After rising and spreading through the groundwater zone, the injected residual soil gas (which now contains contaminants taken up from the groundwater) once again reaches the vadose zone and is subsequently drawn up into the decontamination system through vent well 1 for recirculation through the system for separation and treatment of the contaminant.

Oxygen and water vapor in the residual soil gas returned to the ground maintain and enhance the activity of naturally occurring microorganisms which contribute further to the decomposition of contaminants which are biodegradable by such microorganisms.

Two loops pass through absorption tank 3 (i.e. two loops intersect at absorption tank 3). The first loop, labelled "A" in FIG. 1, incorporates the movement of contaminated soil gas from the vadose zone and/or groundwater zone into vent wells (e.g. vent well 1), the introduction of the contaminated soil gas to absorption tank 3, and the return of residual soil gas (including any residual contaminant, reduced volatile(s), and oxidation products) from absorption tank 3 into the ground for recirculation to complete the cycle. In other words, contaminated soil gas is circulated through loop A by removing the contaminated soil gas from the ground through vent well 1, introducing the removed contaminated soil gas through line 20 to absorption tank 3 (or separation means), and returning residual contaminated soil gas to the ground via line 25 and return wells 5 and 6, where, upon such return, the returned residual soil gas is available for recirculation through vent well 1 (or other vent well). As previously described, the returned residual soil gas can capture additional contaminant for separation (e.g. by absorption) and treatment (e.g. by biodegradation) when recirculated through the decontamination system. The inclusion of loop A in the system eliminates the venting of volatile contaminants to the atmosphere and allows for more complete removal of contaminants by re-cycling material through the system. The return of gas or vapors from absorption tank 3 to the ground maintains the moisture content of the ground and augments soil gas oxygen concentrations. Thus loop A includes significant and innovative features of the complete inventive system.

The second loop is a loop through which the absorbing liquid circulates and is labelled "B" in FIG. 1. Liquid is taken from the perimeter of absorption tank 3 to avoid introducing air or gas bubbles into the lines of loop B, as shown in FIG. 1. Pump 7 circulates liquid from tank 3 to bioreactor 8 and back to tank 3. Metering pump 9 supplies nutrient solution to the bioreactor from nutrient tank 10. The nutrient solution may be oxygenated from oxygen tank 11 prior to its addition to bioreactor 8. The oxygen supply is produced by oxygen generator 12. Air dryer 13 and water/oil separator 14 clean and dry the air provided by air compressor 15. These steps protect and extend the life of the oxygen generator.

Loop B, also referred to as a separation or absorption loop, can optionally include a circulating microorganism that is effective for the biodegradation of the contaminant. This microorganism can be of the same kind as the microorganism resident in bioreactor 8 or can be different. In alternative embodiments of my invention, the bioreactor 8 can be excluded, and the circulating microorganism (or other oxidizing agent circulating in loop B) can be utilized for the biodegradation of the contaminant (or for the other oxidation of the contaminant). In yet other embodiments of the invention absorption tank 3 can be excluded from loop B and the absorption of contaminant can be accomplished through the circulating liquid (i.e. the contaminated soil gas is introduced into loop B for contact with the circulating liquid and for absorption of contaminant by the circulating liquid).

The embodiment of my invention shown in FIG. 1 is a closed loop system. A closed loop system means that the contaminated soil gas (including residual soil gas) and the contaminant are not released or removed from the system but are recycled to the ground.

Miscellaneous System Components

Commercially available air compressors and fluid pumps, oxygen generators, oxygen tanks, air dryers, water/oil separators, metering pumps, and holding tanks can be used in the practice of the invention. The system can include a nutrient supply, a water source and a surfactant supply.

Separation Means

Absorption tank 3 serves as a means for separating the contaminant from the contaminated soil gas. In this embodiment of my invention, the separation is accomplished through absorption of the contaminant from the gas phase (the contaminated soil gas) to the liquid phase (the absorbing liquid in tank 3 which also circulates through loop B). Absorption, as used herein, is intended to include any means or mechanism for transfer of the contaminant from the gas phrase to the liquid phase. This may include a situation where the liquid captures small bubbles of non-soluble gaseous contaminant which can be exposed to the microorganism for biodegradation (or to other oxidation means). An absorption means (e.g. a liquid effective for absorption of the contaminant) is the preferred means of contaminant separation, but other means for separation of contaminant from the contaminated soil gas can be used.

Absorption tank 3, in the embodiment of my invention shown in FIG. 1, is a spherical tank with a 6 foot diameter, of cross-linked poly construction. The absorption tank can be any vessel which contains the absorption liquid for contact with the contaminated gas. The absorption means can be replaced by some other absorption means. For example, the absorption means can consist of one or more absorption columns, or any other means by which contaminants can be transferred from the contaminated soil gas to the liquid. Although not preferred, loop B alone (without absorption tank 3) can serve as the absorption means, because contaminated soil gas introduced into loop B will contact the circulating liquid and absorption will occur.

The absorption means (e.g. absorption tank or absorption columns) will preferably contain a packing material, which will cause a decrease in the size of the bubbles of contaminated gas as they rise through the absorption means, facilitating absorption of the contaminant into the liquid. Although the primary function of the absorption means is to accomplish the transfer of contaminant from the gas phase to solution or suspension in the liquid, the absorption means may contain a microorganism effective for the biodegradation of the contaminant. The packing material in the tank or column can act as a substrate to support the microorganism and its growth. With the addition of the microorganism, the absorption tank or column also serves as an additional bioreactor (and, therefore, a treatment means).

The liquid circulating in loop B and contained in absorption tank 3 can be any liquid effective for absorption of the contaminant. Preferably, the liquid is water or a waterbased solution. The choice of liquid will depend in substantial part on the nature of the targeted contaminant(s). The liquid may also contain a surfactant (e.g. an anionic biosurfactant such as glycolipids, or a non-ionic chemical surfactant such as Bio-Solve TM, Solvent, available commercially from Metrachem) or other absorption promoting agents. The liquid may also serve as a carrier for the microorganism, if any, circulating in loop B. Preferably, the separation means (e.g. absorption means) is used in combination with a treatment means (e.g. a bioreactor). The separation of contaminant from the contaminated solid gas facilitates treatment of the contaminant. Although not preferred, the separated contaminant can be disposed of (with or without treatment). Such practice, however, may not be environmentally sound. Treatment and a closed loop (for return of material to the ground) is preferred and offers significant advantages over alternative methods.

Treatment Means—Bioreactor

Contaminants are introduced to a liquid carrier via the absorption means (e.g. absorption tank 3). Contaminants are then carried to bioreactor 8 in loop B, as shown in FIG. 1. Bioreactor 8 contains a microorganism effective for biodegradation of the contaminant. The bioreactor can be any vessel, or even loop segment or conduit segment, in which the microorganism is resident. A vessel adapted to contain the microorganism is preferred. Such a vessel will ideally contain a packing which provides a large surface area on which the microorganism can grow. Alternatively, a filter or other blocking means can be employed to contain the microorganism within a segment of the loop or conduit. Loop B may contain one or more bioreactors. The microorganism may reside exclusively in the bioreactor(s), with the liquid serving simply to carry contaminants from the absorption means to the bioreactor. Alternatively, both the bioreactor and the circulating liquid may contain microorganisms effective for biodegradation. The bioreactor and the liquid may contain either the same type or different types of microorganisms.

Both the absorption means and the bioreactor are preferably packed with a packing material, as noted above. Preferably, the packing is in the form of spherical-shaped "tripacks", which are commercially available as packing for columns. The tri-packs (or "Bio-Balls") essentially consists of three disks which intersect each other along a common central axis in a configuration which approximates the shape and form of a sphere. The tri-packs provide a substantial surface area for supporting the microorganism. In this embodiment of the invention, the tripacks in absorption tank 3 and bioreactor 8 have a one inch diameter and provide approximately 80 square feet of surface area per cubic foot. Other sizes, forms and kinds of packing can be used in the practice of my invention. For example, flat disks, volcanic rock (such as scoria) and other substrates capable of supporting the bacteria (or other microorganisms) can be used. The packing is a means for supporting the microorganism. The greater the surface area of the packing covered by microorganism, the greater the opportunity for contact of contaminant with microorganism for biodegradation.

In this embodiment of the invention, a bioreactor is employed as an oxidation means for oxidizing the contaminant, i.e., the biodegradation of the contaminant by the microorganism is the oxidation. In alternative embodiments of my invention, other oxidation means for oxidizing the contaminant can be employed. For example, an ozone chamber can be used in place of the bioreactor to oxidize the contaminant. More broadly, the invention can be practiced with any means for treatment of the contaminant to lessen an environmental hazard of the contaminant.

An environmental hazard is deemed lessened when the treatment of the contaminant results in a product or products whose negative impact on the environment is less than the negative impact of the contaminant. For example, if the treatment is biodegradation, the resulting principal products, water and carbon dioxide, are much desired over the contaminant. My invention is not limited to oxidation or biodegradation as the forms of treatment. Other forms of treatment of the contaminant, now known or later discovered, can be used in the practice of my invention.

Separation of the contaminant from the contaminated soil gas is preferred because such separation facilitates treatment. However, other embodiments of my invention can be practiced in the absence of the separation means. The removed contaminated soil gas can be introduced to the treatment means for treatment without first separating the contaminant.

Selection and Use of Microorganism

The microorganism used in the system (e.g. in bioreactor 8, loop B and absorption tank 3) can include any microorganism(s) effective for the biodegradation of the contaminant(s). If more than one contaminant is present, a single microorganism effective for the biodegradation of some or all of such contaminants can be used, or different microorganisms which are differently effective for the biodegradation of the different contaminants can be employed. The selection of effective microorganisms for my invention is a matter which falls within the knowledge and skill of persons of ordinary skill in the art. Such persons have the requisite knowledge and skill to select and acquire microorganisms which will be effective for biodegradation of the contaminants (or at least those contaminants which the practitioner of the invention targets for treatment). Suitable microorganisms can be selected experimentally (e.g. by trial and error) or from available literature. It rests within the discretion of the practitioner of my invention to select the microorganisms which he/she desires to use for the contaminants targeted by him/her.

In addition to effective bacteria, other microorganisms, such as enzymatic agents (e.g. lignin peroxidase), algae, etc., which are effective for biodegradation of contaminants, can be used in the practice of my invention. The term "microorganism", as used herein, is intended to include any enzyme produced by a microorganism, or any derivative from a microorganism, which is effective for biodegradation of the contaminant or any synthesized or genetically engineered duplication of such enzyme or derivative.

Preferably, the microorganisms are bacteria. For example, an oxidizing bacterial culture such as *Pseudomonas spp* can be used. *Pseudomonas spp.* is effective for the biodegradation of organic contaminants such as benzene, toluene, xylene, jet fuel, crude oils, carbohydrates, soluble or insoluble carbonaceous particulates, etc. Other bacteria are also effective for biodegradation of organic compounds. Preferably, the bacteria are aerobic bacteria, which are active in the presence of oxygen to metabolize organic materials, utilizing the energy thus obtained to generate more bacteria, and producing carbon dioxide and water as by-products. Some undigested solids may also remain.

The bacteria or other microorganisms are preferably acclimated to the contaminants prior to use. Acclimation of bacteria can be achieved by isolating the bacteria (e.g. a generic strain of *Pseudomonas spp.*), strengthening them by feeding them appropriate nutrients, and then feeding them the targeted contaminant. The bacteria, over time, become acclimated to the contaminant, and become dependent upon the contaminant as their feed (or carbon source). Nutrients may be added to support metabolism of the contaminant feed. Bacterial strains which can digest the contaminant survive and thrive. Other strains die. As a result of this acclimation, bacteria strains (e.g. strains of *Pseudomonas spp*) are grown which are especially effective in biodegrading the contaminant. Acclimation of bacteria is a subject beyond the scope of my invention. The knowledge and skills of persons of ordinary skill in the art are such as to enable such persons to acclimate bacteria or to acquire acclimated bacteria suitable for use in the practice of my invention. To the extent that acclimation of other microorganisms to contaminants is feasible, such acclimated microorganisms can also be used.

Use of Surfactant

Figure 3:
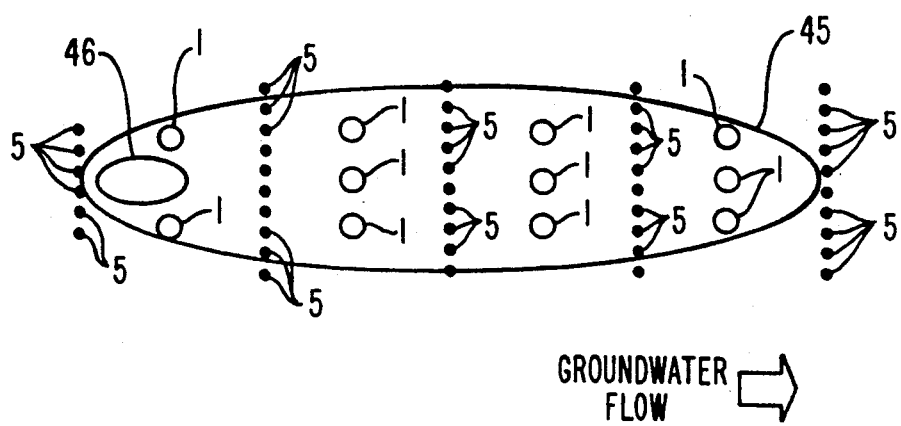
FIG. 3 depicts the placement of wells in an embodiment of the invention used in cases in which contamination is found in the groundwater.

The addition of surfactant to the absorption tank 3 will generate a foam which will cause bio-agent (microorganism) and nutrient to be injected into the subsurface along with the water vapor and excess oxygen from the absorption tank. Introduction of the bio-agent to the ground will speed the biodegradation of contaminants.

Ozonation Chamber

As an alternative to biodegradation, oxidation of contaminants may be accomplished by circulating the water containing the contaminants through an ozonation chamber. In this case, Bioreactor 8 in FIG. 1 would be replaced by the ozonation chamber, and an ozone generator would be included in line with the oxygen supply for the system. Any other nonthermal oxidation method may also be used to treat the contaminants.

Disposal of Water

Contaminated water can be removed from the system for disposal or for treatment by any conventional means rather than for injection into the ground. This is not preferred, however, because the significant advantages conferred by the closed-loop configuration of the system would then be lost.

Placement of Wells

The placement of vent, sparge, and vadose return wells is important and can contribute significantly to the efficient decontamination of the vadose and/or groundwater. Furthermore, the decontamination system efficiency which can be achieved through appropriate well placement greatly reduces time and expense associated with site decontamination. For example, in the groundwater remediation application (see FIG. 3) the sparge (injection) well density requirement for my invention may be greater than for groundwater extraction wells used in an airstripping system, but the vent well density requirement is less, and the increased injection well cost is compensated for by the reductions in project duration and energy consumption requirements.

The porosity of the vadose and the saturated groundwater zone influences the spread rate of the contaminant and also the appropriate choice of well placement. A higher degree of porosity in the groundwater zone allows for the spread of contaminant laterally as well as rising vertically into the groundwater following injection of residual soil gas. It also makes feasible the injection of residual soil gas at the base of the contaminated groundwater region via sparge wells. If the groundwater zone is extremely non-porous, the use of sparge wells in the groundwater zone is not effective. The preferred placement of wells is described for two different types of subsurface contamination in the following examples.

In cases in which the vadose zone is contaminated, but the underlying groundwater is not, the preferred embodiment of my invention includes the placement of vent wells (vapor extraction wells) around the perimeter of the contaminated area. Vadose return wells are used within the area to provide for the return of residual soil gas including water vapor, oxygen, and unoxidized contaminants to the ground. This placement of wells is illustrated in FIG. 2. Sparge wells located in the groundwater zone may be used even if there is no groundwater contamination in order to create water vapor from groundwater which will rise into the vadose zone. In the event that there are localized regions of very limited groundwater contamination, with contamination primarily concentrated in the vadose, sparge wells can be placed in areas of contaminated groundwater to volatilize the volatile contaminants, which are carried in bubbles up to the vadose zone for removal.

In FIG. 2, vent wells 1 are located around the periphery of a contaminated ground region 40. Preferably, vent wells 1 surround the contamination plume resulting from a contamination source 41. At least one vadose return well 6 is located within ground region 40 and, preferably, within contamination source 41. Vent wells 1 establish a zone of low pressure. Return well 6 establishes a zone of high pressure. These zones of low pressure and high pressure cause the returned residual soil gas to flow from return well 6 to vent wells 1 for removal and recirculation. Thus, contaminated ground region 40 is a pneumatically controlled region (i.e., the returned residual soil gas is contained within the controlled region 40). As mentioned above, a return well in the groundwater zone (e.g. sparge well 5) can also be located in the contaminated ground region (preferably in the region of the contamination source 41).

In cases in which the ground is contaminated with contaminated groundwater (typically accompanied by at least one locus of contamination in the overlying vadose zone), the preferred embodiment of my invention includes the placement of spaced "drapes" of return wells 5 (e.g. sparge wells) in the groundwater zone of the ground, as shown in FIG. 3. The drapes are positioned such that the groundwater flows through the drapes. Preferably, the drapes are placed perpendicular to the groundwater gradient (i.e to the predominant direction of groundwater flow). As shown in FIG. 3, a drape is placed at each end of the contaminated region 45. Source 46 is the contamination source. One drape (the leftmost drape in FIG. 3) is the upstream drape and is used for containment purposes (i.e. to prevent further spread of contaminant in the ground). Another drape, the drape proximal to the point of contamination most distant from the contamination source 46, is the downstream drape and is also used for containment purposes. Additional groundwater zone return well drapes can be located within the contaminated region 45, also oriented perpendicular to the groundwater gradient. Rows of vent wells (vapor extraction wells) 1 are placed within the contaminated region 45 and perpendicular to the groundwater gradient. Although vent well rows are depicted in FIG. 3, in many applications it may be sufficient to have a single vent well located between the drapes. This placement of return wells 5 accomplishes two objectives: 1) Reducing contaminant concentration at the source 46 to reduce further contamination of the downgradient contamination plume area, and 2) decontaminating water flowing away from the source. By taking advantage of the potential energy of the natural flow of groundwater and removing contaminants from it as it passes through the "drape" of returned residual soil gas rising under the ground, the invention makes it possible to decontaminate a large volume of water without the expense and large amount of time involved in pumping the water above ground for decontamination. For example, in FIG. 3, if the groundwater is moving downgradient at a velocity of 1000 feet/year, and the contaminated area is one-half mile in length, the entire water volume will have passed between two adjacent sparge drapes in only six months, rather than the 2.5 years required to flow 2600 feet downgradient otherwise. 15 to 20 years could be required if the area was decontaminated using conventional air stripping which would require pumping the entire aquifer volume up the surface several times. The use of multiple lines of return wells 5 (sparge wells located in the groundwater zone) and vent wells 1 (located in the vadose zone) allows more rapid decontamination of an area of contaminated groundwater at a significantly lower energy cost.

The wells used in the preferred embodiment of this invention consist of a length of perforated casing (perforated with slots which are typically 0.01 to 0.02 inches in width) at the end of an unperforated length of casing. The preferred dimensions of the perforations is dependent on the type of soil in which the wells are to be placed, and the selection of perforation size falls within the expertise of persons of ordinary skill in the art. The well casing is typically placed in a hole drilled in the ground and sand (or other porous material) is packed around the well casing. These wells are of standard design and are known to persons of ordinary skill in the art, as is the process used for drilling and packing the wells.

The foregoing description of the invention and the drawings so fully reveal the general nature and the innovations and advantages of the invention that others can readily modify such invention and/or adapt it for various applications without departing from its general concepts, and, therefore such adaptations and modifications should be and are intended to be comprehended within the meaning and range of the claims appended hereto and their equivalents, which claims define subject matter regarded to be the invention described herein.

I claim:

1. A method for decontamination of contaminated ground, said method comprising:
   (a) removing soil gas contaminated with a contaminant from the ground, and
   (b) returning said contaminated solid gas to the ground for distribution of said contaminant over a larger area of ground to facilitate natural biodegradation of said contaminant in the ground.

2. A method in accordance with claim 1 wherein, prior to step (b), said contaminant is treated to lessen an environmental hazard of said contaminated soil gas.

3. A method in accordance with claim 1 wherein said returned contaminated soil gas is returned to a pneumatically controlled zone of the ground.

4. A system for decontamination of contaminated ground in a contaminated ground region, said system comprising:
   (a) a plurality of vent wells located around the periphery of the contaminated ground region to establish a zone of low pressure,
   (b) at least one return well located in said contaminated ground region to establish a zone of high pressure,
   (c) a removal means,
   (d) a separation means, and
   (e) an injection means;
   wherein said removal means is a means for removal of soil gas contaminated with a contaminant from said contaminated ground region via said vent wells and a means for introducing said removed contaminated soil gas to said separation means;
   wherein said separation means is a means for separating said contaminant from said removed contaminated soil gas, which separation results in separated contaminant and residual soil gas;
   wherein said injection means is a means for returning said residual soil gas, including any residual contaminant, to said contaminated ground region via said at least one return well; and wherein said zone of high pressure and said zone of low pressure causes said returned residual soil gas to flow from said at least one return well to said vent wells.

5. A system in accordance with claim 4 wherein said vent wells are located in a vadose zone; and wherein said at least one return well is located in a vadose zone.

6. A system in accordance with claim 5 further comprising a return well located in a groundwater zone of said contaminated ground region.

7. A system in accordance with claim 5 wherein said at least one return well is located in a contamination source; and wherein said contamination source is the source of said contaminant.

8. A system in accordance with claim 5 wherein said separation means is an absorption means for absorption of said contaminant; and wherein said system further comprises an oxidation means for oxidation of said separated contaminant.

9. A system for decontamination of ground contaminated with contaminated groundwater flowing in a direction in a contaminated ground region, said system comprising:
   (a) a drape of return wells positioned across the contaminated ground region,
   (b) at least one vent well positioned in the contaminated ground region,
   (c) a removal means,
   (d) a treatment means, and
   (e) an injection means;
   wherein said removal means is a means for removal of soil gas contaminated with contaminant from said groundwater via said vent well and a means for introducing said removed contaminated soil gas to said treatment means;
   wherein said treatment means is a means for treating said contaminant to lessen an environmental hazard of said contaminant, which treatment results in a residual soil gas; wherein said injection means is a means for returning said residual soil gas, including any residual contaminant, to said contaminated ground region via said drape of return wells; and wherein said groundwater flows through said drape.

10. A system in accordance with claim 9 further comprising a second drape of return wells positioned across the contaminated ground region; wherein said groundwater flows through said second drape; and wherein said at least one vent well is located between said drapes; and wherein said injection means is also a means for returning residual soil gas to the contaminated ground region via said second drape of return wells.

11. A system in accordance with claim 10 further comprising an upstream drape of return wells and a downstream drape of return wells for containment purposes; wherein said system includes at least one vent well in each area between drapes; and wherein said removal means is also a means for removal of the contaminated soil gas via said vent wells; and wherein said injection means is also a means for returning residual soil gas to the contaminated ground region via the return wells of the upstream drape and the downstream drape.

12. A method for decontaminating contaminated ground, said method comprising:
(a) removing soil gas contaminated with a contaminant from the ground,
(b) separating said contaminated from said contaminated soil gas, which separation results in separated contaminant and residual soil gas,
(c) treating said separated contaminant to lessen an environmental hazard of said separated contaminant, and
(d) returning said residual soil gas to the ground;
wherein the return of said residual soil gas to the ground results in recirculation of said residual soil gas as contaminated soil gas in steps (a), (b), (c) and (d);
wherein (a), (b), (c) and (d) form a closed loop system; wherein the ground includes a vadose zone; and wherein said contaminated soil gas is removed from the vadose zone in step (a).

13. A method in accordance with claim 12 wherein the ground includes a groundwater zone; and wherein said contaminant is a volatile contaminant from contaminated groundwater in said groundwater zone.

14. A method in accordance with claim 13 wherein said residual soil gas is returned to said groundwater zone.

15. A method in accordance with claim 12 wherein said residual soil gas is returned to said vadose zone.

16. A method for decontaminating contaminated ground, said method comprising:
(a) removing soil gas contaminated with a contaminant from the ground,
(b) treating said contaminant to lessen an environmental hazard of said contaminant, said treatment resulting in a residual soil gas, and
(c) returning said residual soil gas to the ground;
wherein the return of said residual soil gas to the ground results in recirculation of said residual soil gas as contaminated soil gas in steps (a), (b) and (c);
wherein (a), (b), and (c) form a closed loop system;
wherein said treatment comprises oxidation of said contaminant; and
wherein water vapor is a product of said oxidation and said water vapor is included with the residual soil gas returned to the ground.

17. A decontamination system for decontamination of contaminated ground, said system comprising:
(a) a removal means,
(b) a separation means,
(c) an injection means, and
(d) a treatment means for treating said separated contaminant to lessen an environmental hazard of said contaminant;
wherein said removal means is a means for removal of soil gas contaminated with a contaminant from the ground and for introduction of said removed contaminated soil gas to said separation means;
wherein said separation means is a means for separating said contaminant from said removed contaminated soil gas, which separation results in separated contaminant and residual soil gas;
wherein said injection means is a means for returning said residual soil gas to the ground for recirculation through (a), (b) and (c);
wherein said separation means comprises a liquid effective for absorption of said contaminant from said removed contaminated soil gas;
wherein said liquid circulates through said oxidation means; wherein said oxidation means is a means for oxidizing said separated contaminant; and
wherein said system is a closed loop system.

18. A decontamination system for decontamination of contaminated ground, said system comprising:
(a) a removal means,
(b) a treatment means, and
(c) an injection means;
wherein said removal means is a means for removal of soil gas contaminated with a contaminant from the ground and for introduction of said removed contaminated soil gas to said treatment means;
wherein said treatment means is a means for treating said contaminant to lessen an environmental hazard of said contaminant, which treatment results in a residual soil gas; and
wherein said injection means is a means for returning said residual soil gas to the ground for recirculation through (a), (b) and (c);
wherein (a), (b) and (c) form a closed loop system.

19. A decontamination system in accordance with claim 18 wherein said treatment means comprises a means for oxidation of said contaminant.

20. A method for decontaminating contaminated ground, said method comprising:
(a) removing soil gas contaminated with a contaminant from the ground,
(b) separating said contaminant from said contaminated soil gas, which separation results in separated contaminant and residual soil gas,
(c) treating said separated contaminant to lessen an environmental hazard of said separated contaminant,
(d) returning said residual soil gas to the ground, and
(e) oxidizing said separated contaminant;
wherein the return of said residual soil gas to the ground results in recirculation of said residual soil gas as contaminated soil gas in steps (a), (b), (c) and (d);
wherein (a), (b), (c) and (d) form a closed loop system; wherein said oxidation is accomplished with a microorganism effective for biodegradation of said contaminant; and
wherein water vapor is a product of said oxidation and said water vapor is included with the residual soil gas returned to the ground.

* * * * *